Nov. 30, 1943.                    D. F. CLIFTON                    2,335,235
                          HARDNESS TESTING INSTRUMENT
                              Filed May 14, 1941                2 Sheets-Sheet 1
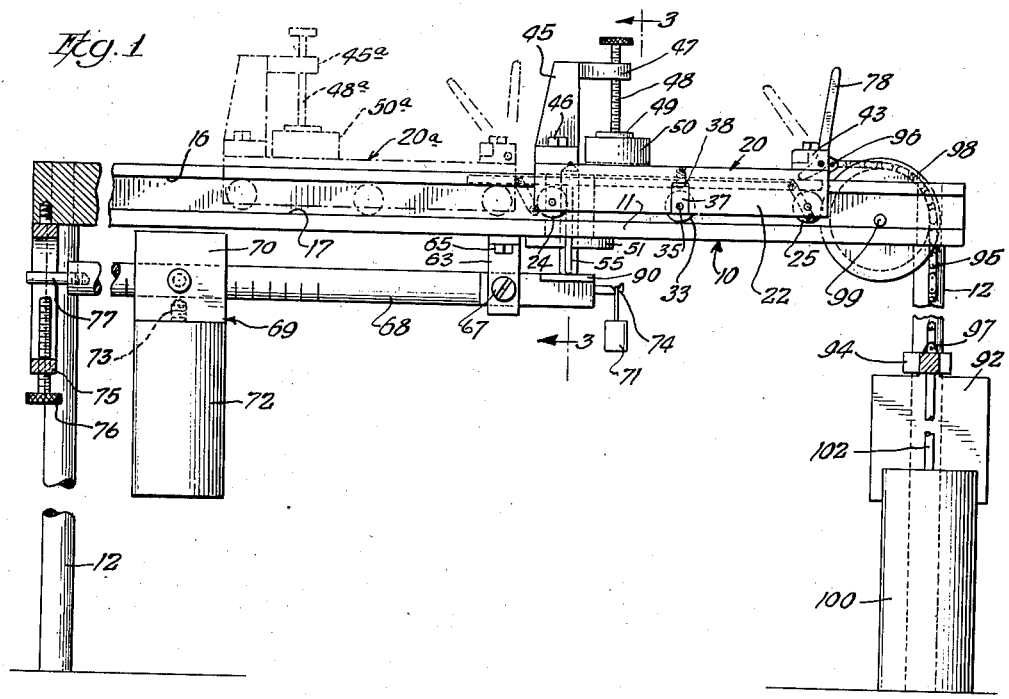
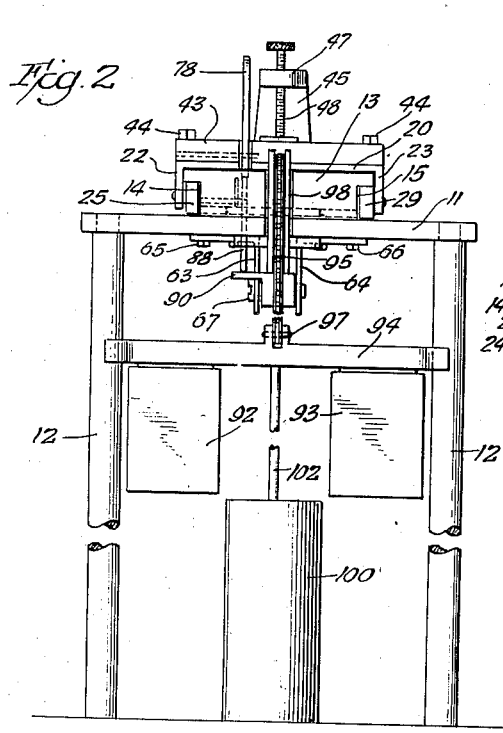
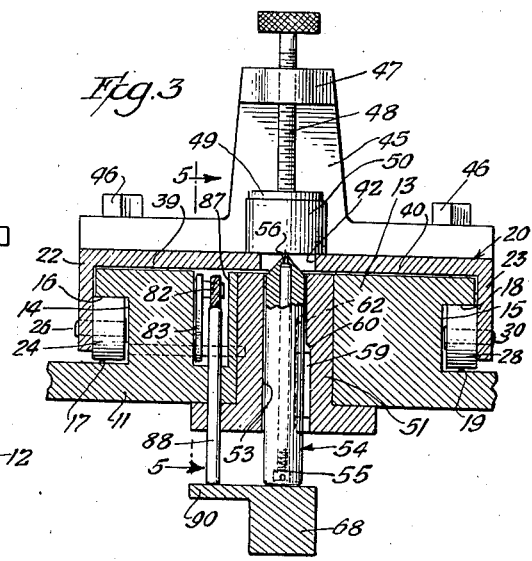
Inventor:
Donald F. Clifton
by
H. Thrall Brewer
his Atty.

Nov. 30, 1943. D. F. CLIFTON 2,335,235
HARDNESS TESTING INSTRUMENT
Filed May 14, 1941 2 Sheets-Sheet 2
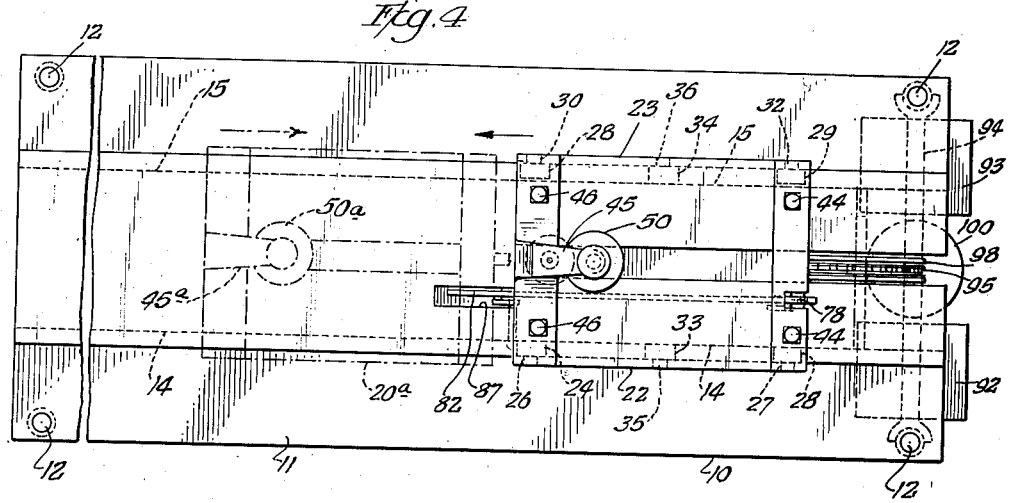
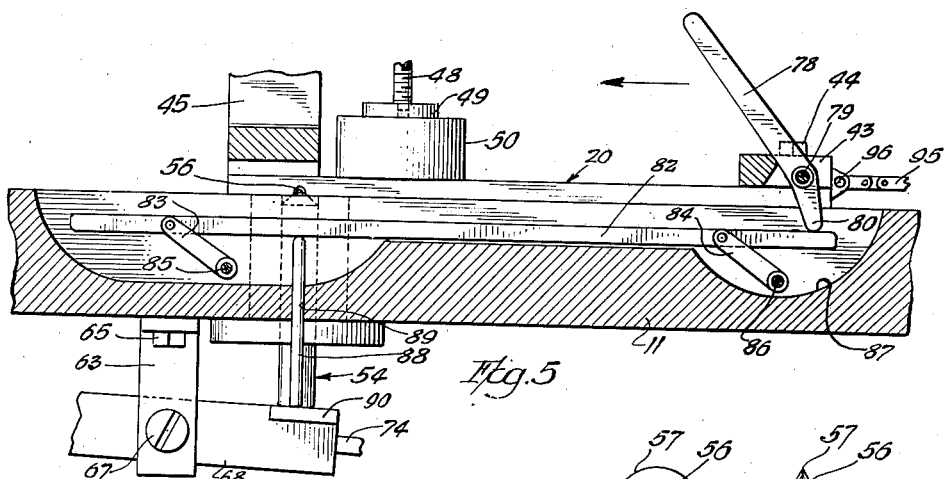
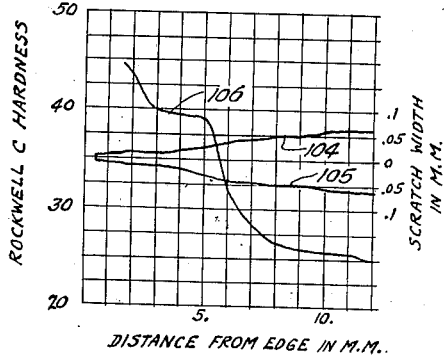
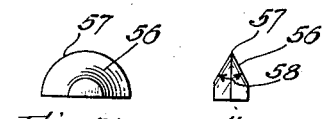
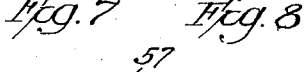
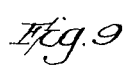
Inventor:
Donald F. Clifton
BY
his Atty.

Patented Nov. 30, 1943

2,335,235

UNITED STATES PATENT OFFICE 2,335,235

HARDNESS TESTING INSTRUMENT

Donald F. Clifton, Milwaukee, Wis.

Application May 14, 1941, Serial No. 393,325

6 Claims. (Cl. 265—12)

This invention relates to a testing instrument, and more particularly to an improved testing instrument for determining certain properties of materials such as metals.

An object of this invention is to provide an improved testing instrument adapted quickly and easily to determine the hardness of metal specimens.

Another object of this invention is to provide a hardness testing instrument for metals which is adapted to determination of case depth, case hardness and absolute hardness of the metals.

Another object of this invention is to provide a hardness testing instrument for metals which gives a continuous indication of the hardness across a given surface.

Another object of this invention is to provide a testing instrument for measuring hardness characteristics of metal which provides accurate test results when the surface of the specimen to be tested is first subjected to only a reasonably smooth polish, as distinguished from the micro-polish which is usually required and which requires considerably more polishing effort and time.

Another object of this invention is to provide a testing instrument for measuring hardness of materials by scratching a smooth surface of the material, which instrument includes means for varying the load or pressure on the scratching edge to that best suited to the material under test and the type of test being made.

Another object of this invention is to provide a testing instrument for determining hardness characteristics of metal which includes means for effecting relatively uniform relative movement between the specimen of metal being tested and a scratching instrumentality.

Another object of this invention is to provide a testing instrument having specimen holding and specimen testing parts which are relatively movable with the movement for testing automatic and the return movement manually effected. The preferred embodiment of this invention also includes means effective upon the manual return movement for separating the test specimen and specimen testing part.

Other objects and advantages of this invention relate to various features of construction and arrangement of parts which will be apparent from a consideration of the following specification and accompanying drawings, wherein Figs. 1 and 2 are respectively side and end elevational views of a testing instrument embodying a preferred form of the present invention;

Fig. 3 is a fragmentary sectional view with the section taken substantially on a line 3—3 of Fig. 1 and looking in the direction of the arrows;

Fig. 4 is a top view of the testing instrument shown in Figs. 1 and 2;

Fig. 5 is a fragmentary sectional view with the section indicated by the line 5—5 and directional arrows in Fig. 3;

Fig. 6 is a graphic illustration utilized in connection with the explanation of the operation of the disclosed testing instrument; and Figs. 7, 8 and 9 are respectively side, end and top views of a part of the testing instrument disclosed.

Having particular reference to the drawings, a support or table 10 has a top or plate 11 which is supported by legs 12. The top or plate 11 has a central portion 13 of increased thickness having channels 14 and 15 on opposite sides thereof which provide a pair of parallel tracks. The parallel tracks provided by the channels 14 and 15 each have oppositely disposed parallel flat surfaces such as surfaces 16 and 17 of the channel 14 and surfaces 18 and 19 of the channel 15.

A specimen carrying platform 20 having drop sides 22 and 23 slidably fits over the central portion 13 of the top or plate 11 and is sufficiently snug thereon to prevent side play. The sides 22 and 23 extend over the channels 14 and 15. Rollers 24 and 25 are rotatably mounted on studs 26 and 27 which are secured to the side 22 of the specimen carrying platform and are preferably located near the ends of the platform with the rollers disposed in the channel 14. Similar rollers 28 and 29 are rotatably supported on studs 30 and 32 which are secured to the side 23 of the specimen carrying platform. Rollers 33 and 34 are preferably located between the rollers 24 and 25 and 28 and 29 respectively and are rotatably mounted on studs 35 and 36 respectively. The studs 35 and 36 are preferably secured to blocks such as that indicated at 37 in Fig. 1 which blocks are movable within limits toward and away from one of the track surfaces, and are adjustable by screws such as 38 to effect engagement of the rollers 33 and 34 with the track on one side of each of the channels 14 and 15 and engagement of the other rollers with the track surfaces on the opposite sides of the channels. This adjustment is made to insure contact between the rollers and the track surfaces and to eliminate play. By this mounting of the specimen carrying platform 20, it is movable longitudinally along the table or support 10.

The specimen carrying platform 20 preferably comprises two halves 39 and 40 which are spaced apart to provide a longitudinal slot 42 which is intermediate and extends parallel to the sides 22 and 23. The halves 39 and 40 of the specimen carrying platform are secured together at one end by a block or strap 43 which is secured to the halves by bolts such as 44, and at the other end by a specimen clamping bracket 45 which is secured to the halves by bolts such as 46 or other suitable fastening means. The specimen clamping bracket 45 has an angularly projecting portion 47 through which a thumbscrew 48 is threaded, which thumbscrew has rotatably mounted on one end thereof a disk-like element 49 which is adapted to engage a test specimen 50 and clamp the test specimen in place against the specimen carrying platform 20 and across the longitudinal slot 42.

A journal bearing 51 extends through the central portion 13 of the top of the table and has a bearing opening 53 therein which is in alignment with the slot 42 in the specimen carrying table. A cutting instrumentality 54 comprises a shaft 55 which is slidably journaled in the opening 53 and a cutting tip 56 which preferably is a diamond and is secured to the upper end of the shaft 55. The shaft 55 is preferably drilled longitudinally and has a small opening at the tip through which the cutting tip extends, but cannot pass. The cutting tip is preferably held in place with the cutting edge or tip extending from the end of the shaft by a long set screw or other suitable fastening means which is threaded into the longitudinal opening in the shaft. The cutting tip 56 is illustrated in enlarged views in Figs. 7, 8 and 9. It preferably has a curved cutting edge 57 provided by the intersection of two frusto-conically shaped halves. The plane of the cutting edge is preferably parallel to the axis of movement of the specimen carrying platform 20 and to the longitudinal axis of the slot 42. The angle 58 between the sides of the cutting tip 56, while not at all critical, should be sufficiently large to provide a noticeable difference in the width of the cut produced thereby for different depths of the cut, as for example about 75 degrees. A key 59 which is held in a slot 60 in the bearing 51 is slidable in the key-way 62 in the shaft 55 to maintain the proper disposition of the cutting edge with respect to the movement of the specimen-carrying table.

A pair of brackets 63 and 64 are secured to the under side of the plate or top 11 of the table by bolts or other suitable fastening means 65 and 66. A screw 67 extends through the bracket 63 and is threaded into the bracket 64 to provide a fulcrum for a beam or lever 68. One end of the beam or lever 68 engages the end of the shaft 55 of the cutting instrumentality and a weight 69 is mounted on and adjustable to different positions along the beam or lever 68 on the opposite side of the fulcrum from the cutting instrumentality 54. The adjustable weight provides an adjustable biasing force for biasing the cutting instrumentality in one direction and into engagement with the test specimen 50. The weight 69 has a portion 70 which is mounted on the beam or lever 68 and a portion 72 which is removably secured to the portion 70 by a stud 73 which is threaded into the portion 70 so that in addition to the change of the biasing force by movement of the weight along the beam or lever, the mass of the weight may be varied to a value suitable for a particular test on a particular specimen. A hook is preferably provided on the end of the beam or lever 68 adjacent to the cutting instrumentality 54 from which hook a weight 71 is hung to balance the beam or lever 68, thereby to overcome the normal unbalance of the beam caused by the difference of length of the two sides thereof. A bracket 75 is secured to the table 10 and has thumb-screw 76 threaded therein which is adapted to engage a projecting shaft 77 on the end of the beam or lever 68 to limit the downward movement of the weighted end of the beam when the cutting instrumentality is not limited in its movement by the surface of a test specimen.

The specimen carrying platform 20 is manually movable in one direction by force applied to a handle 78, which handle is rotatably supported on a stud 79 at the end of the block or strap 43. The handle 78 preferably has a cam portion or extension 80 which engages a rail 82 upon the application of force to the handle to move the specimen carrying platform to the left as viewed in Fig. 5. The rail is rotatably connected to arms 83 and 84, which arms are rotatably supported on shafts 85 and 86 respectively which are secured to the plate or top 11. The rail 82 and arms 83 and 84 are disposed in a recess 87 in the central portion 13 of the top at one side of the bearing 51. The rail 82 is in alignment with and engages one end of a shaft 88 which is slidable longitudinally in an opening 89 in the top or plate 11. The other end of the shaft 88 rests against the surface of a projecting portion 90 on the end of the beam or lever 68 adjacent the cutting instrumentality 54. When the handle 78 is moved to the position shown in Fig. 5, the cam portion 80 moves the rail 82 downwardly and the rail in turn moves the shaft 88 to move the beam or lever 68 against the biasing force of the weight 69, thereby to remove the biasing force from the cutting instrumentality 54. When the handle 78 is returned to the normal position as indicated by the solid lines in Fig. 1, the biasing force of the weight 69 is again applied to the cutting instrumentality 54.

A pair of weights 92 and 93 are secured to a cross-bar 94, which cross-bar is recessed at the ends to fit around the legs 12 of the table to maintain the alignment of the bar. A chain 95 or other suitable flexible connecting means has one end secured to the specimen carrying platform 20 at 96 and the other end secured to the cross-bar 94. The chain 95 extends over a suitable pulley or sprocket 98 which is rotatably supported by the table on a shaft 99. The weights 92 and 93 provide the force for moving the specimen carrying table in one direction during the making of a test cut or scratch in a particular test specimen. In order to provide greater uniformity of the movement of the specimen carrying platform when actuated by weights 92 and 93, a dash-pot 100 is preferably provided which carries a suitable controlling fluid and piston therein to control the movement of the piston and weights, which piston is connected to the cross-bar 94 by a shaft 102. The return movement is effected by manual force as previously described and by operation of the handle 78, as described, the biasing force on the cutting instrumentality is removed during the manual return movement.

In the operation of the disclosed testing instrument, rollers 33 and 34 are adjusted by the adjustment of the screws such as 38 to positions such that all of the rollers engage their respective track surfaces to provide for smooth longitudinal or horizontal movement of the specimen carrying platform 20 without play or free vertical movement of the specimen carrying platform with respect to the table or support.

A test specimen such as 50 is held in place on the specimen carrying platform by the specimen clamping bracket 45 and thumscrew 48. The specimen is sufficiently large to extend across the slot 42. The surface of the specimen adjacent the slot 42 should be flat and smooth, but reasonably accurate indications of hardness may be obtained with the disclosed testing instrument without having the indicating or test surface of the specimen highy polished, as to the extent of a micro-polish.

When the specimen is put in place to obtain a test of the hardness characteristics thereof, the specimen carrying platform and the parts which move therewith with respect to the table are preferably moved manually to a position at one side of the cutting instrumentality 55, as indicated by the dot and dash lines in Figs. 1 and 4 and the corresponding parts referred to by similar reference numerals and the subscript "a." The specimen carrying platform is then in position automatically to be moved by the weights 92 and 93 under the control of the dash-pot 100. This provides relatively uniform motion of the test specimen across the cutting edge of the cutting instrumentality. With a predetermined weight or mass 69 adjusted to a particular position, the cutting instrumentality is biased against the surface of the test specimen as it moves across the cutting edge, so that a straight cut or scratch is provided in the smooth surface of the test specimen, which cut or scratch penetrates to a depth dependent upon the hardness of the test specimen. By providing a continuous straight cut or scratch across the surface of the test specimen, the hardness of the specimen is continuously indicated across the surface.

Referring particularly to Fig. 6, the space between the lines of 104 and 105 indicates the variation in width of a cut or scratch such as that obtained by the use of the disclosed testing instrument for a test specimen such as case-hardened steel. The corresponding line or curve 106 indicates the hardness curve for the same test specimen obtained on a testing instrument of a different type known as the Rockwell hardness tester. The lines 104 and 105 indicate the outline or width variations of a cut or scratch made by the present testing instrument and as viewed under a micrometer microscope. The wedge shape of the cutting tip 56 provides the variation in width of the scratch which corresponds to the variation and the penetration of the cutting tip into the surface of the test specimen.

In determining case hardness, case depth and absolute hardness of a specimen, a constant load is applied to the cutting instrumentality by adjustment of the position and mass of the weight 69. The mass and position of the weight 69 are determined first by the relative hardness of the particular metal which is being tested. That is, metals such as steel require greater force on the cutting edge to provide a satisfactory indication than do the softer metals. In the determination of case depth, it is preferable to select what may be termed a critical load, which load is that which provides the most clear indication of the widening of the cut or scratch when the hardened case has been passed. The cut or scratch remains narrow across the hardened case and becomes wider when the softer inner metal is reached. The depth of the case may be measured under a micrometer microscope by measurement of the length of the narrow portion of the cut or scratch on the surface of the test specimen. The remainder of the cut or scratch provides a continuous indication of the hardness of the metal across the remainder of the surface. As a general rule, it is preferable to adjust the force on the cutting instrumentality to provide a cut or scratch which is sufficiently wide that it is not affected by the grain structure of the metal. In measuring absolute hardness it is naturally necessary to use a preselected biasing force for the test specimen, so as to get comparative variations in scratch width between various test specimens.

The provision of the continuous hardness test across the surface of a specimen has a particular advantage over testing instruments which necessitate sampling of hardness characteristics at selected spaced points across the surface, not only because the indication is continuous, but also because it is not possible that a test made at one selected point will change the test results obtained at another point nearby. Another advantage of the present testing instrument is that scratches or cuts may be made across the surface of a test specimen in different directions to determine whether the directional properties of the metal have any influence on the results obtained.

While an embodiment of the invention has been shown and described for the purpose of illustration, the applicant does not wish to be restricted specifically thereto since various modifications may be made without departing from the spirit of the invention.

What is claimed as new and upon which it is desired to secure Letters Patent is:

1. A testing instrument for measuring hardness characteristics of a test specimen comprising, in combination, a supporting table, a specimen carrying platform movable linearly along the table and having specimen clamping means thereon, said platform having a longitudinal slot therein, a shaft journaled in and extending through said table for linear movement perpendicular to the plane of the platform and adapted to extend through the slot in the platform, said shaft having a jewel cutting edge secured to the end thereof which extends through the slot, a fulcrumed lever arm secured to the table and having one end engaging the end of the shaft opposite the jewel cutting edge, means for balancing said lever, adjustable weight means mounted on said lever on the side of the fulcrum opposite the shaft to bias the shaft and jewel cutting edge in a direction toward the specimen, means comprising weights for moving the platform in one direction to move the specimen with respect to the cutting edge while the cutting edge is biased toward the specimen, and manually operable means for moving the platform in the other direction and at the same time preventing said weight means and lever from biasing the shaft.

2. A testing instrument for measuring hardness characteristics of a test specimen comprising, in combination, a supporting table including means providing a pair of parallel tracks each having oppositely disposed parallel track surfaces, said table also having a journal bearing extending therethrough intermediate the tracks, a specimen carrying platform having rollers rotatably mounted thereon, some of which rollers engage one of the track surfaces of each of the tracks and the other rollers engage the oppositely disposed track surfaces, at least one of the rollers for each of the tracks being adjustable toward and away from one of the track surfaces to eliminate play between the rollers and track surfaces, said platform being movable along the tracks on the table and having a slot therethrough in alignment with said journal bearing, specimen holding means on said platform, a shaft journaled in said bearing and extending into said slot, said shaft being movable longitudinally in the bearing and having a cutting edge at the end thereof, and means biasing said shaft in the direction of the end having the cutting edge thereon to bias the cutting edge toward the specimen.

3. In a testing instrument for measuring hardness characteristics of test specimens, the combination comprising a cutting instrumentality, relatively movable parts carrying the test specimen and cutting instrumentality, said specimen and instrumentality each being relatively movable with respect to the other in different transverse directions, means biasing the cutting instrumentality into engagement with the test specimen during movement of the test specimen in one direction with respect to the cutting instrumentality, and cam means operatively connected to the means for biasing the cutting instrumentality for effecting separation of the specimen and cutting instrumentality during movement of the specimen in the opposite direction.

4. In a testing instrument for measuring hardness characteristics of test specimens, the combination comprising, supporting and specimen carrying parts relatively movable in a straight line, one of said parts including means providing a pair of parallel tracks each having oppositely disposed parallel track surfaces, the other of said parts having rollers rotatably mounted thereon, some of said rollers engaging one of the track surfaces of each of the tracks, and others of said rollers engaging the oppositely disposed track surfaces, and at least one of the rollers for each of the tracks being adjustable to eliminate play between the rollers and track surfaces, specimen holding means on the specimen carrying part, and a cutting instrumentality movably carried by the other of said parts, and means applying a predetermined force in one direction upon the cutting instrumentality to bias the cutting instrumentality toward the specimen.

5. In a testing instrument for measuring hardness characteristics of test specimens, the combination comprising a cutting instrumentality, relatively movable parts carrying the test specimen and cutting instrumentality, said specimen and instrumentality being relatively movable with respect to each other in different transverse directions, means moving the specimen carrying part in one direction at a practically uniform rate, means biasing the cutting instrumentality into engagement with the test specimen during movement of the specimen carrying part in said one direction with respect to the cutting instrumentality, means comprising a movably supported lever to which force is applied for moving the specimen carrying part in the opposite direction, and means operatively connecting the lever to the biasing means for the cutting instrumentality and adapted to effect separation of the specimen and cutting instrumentality during movement of the specimen carrying part in said opposite direction by force applied through the lever.

6. A testing instrument for measuring hardness characteristics of a test specimen comprising, in combination, a supporting table, a specimen carrying platform movable linearly along the table, said platform having a longitudinal slot therein, a shaft journaled in and extending through the table for linear movement perpendicular to the plane of the platform and adapted to extend through the slot in the platform, said shaft having a cutting point at the end thereof which extends through the slot, a fulcrumed lever arm secured to the table and having one end engaging the end of the shaft opposite the cutting point, and adjustable weight means mounted on the lever on the side of the fulcrum opposite the shaft to bias the shaft and cutting point in a direction toward the specimen.

DONALD F. CLIFTON.